United States Patent
Sawai

(10) Patent No.: US 8,037,216 B2
(45) Date of Patent: Oct. 11, 2011

(54) DMA TRANSFER CONTROL DEVICE

(75) Inventor: Takatsugu Sawai, Osaka (JP)

(73) Assignee: Panasonic Corporation, Osaka (JP)

( * ) Notice: Subject to any disclaimer, the term of this patent is extended or adjusted under 35 U.S.C. 154(b) by 314 days.

(21) Appl. No.: 12/212,831

(22) Filed: Sep. 18, 2008

(65) Prior Publication Data

US 2009/0164673 A1 Jun. 25, 2009

(30) Foreign Application Priority Data

Dec. 19, 2007 (JP) ................................. 2007-327888

(51) Int. Cl.
G06F 13/28 (2006.01)
G06F 13/00 (2006.01)

(52) U.S. Cl. .............. 710/22; 710/20; 710/34; 709/214; 709/216; 712/225

(58) Field of Classification Search .................. None
See application file for complete search history.

(56) References Cited

U.S. PATENT DOCUMENTS

| | | | | |
|---|---|---|---|---|
| 5,613,162 A * | 3/1997 | Kabenjian | ...................... | 710/22 |
| 2002/0026544 A1 | 2/2002 | Miura | | |
| 2004/0093439 A1 | 5/2004 | Miura et al. | | |
| 2006/0179181 A1 | 8/2006 | Seong | | |
| 2006/0206633 A1 | 9/2006 | Suetake | | |
| 2006/0288128 A1 | 12/2006 | Moskalev et al. | | |
| 2007/0073924 A1 | 3/2007 | Kuroki et al. | | |
| 2008/0201494 A1 * | 8/2008 | Kimelman et al. | ............. | 710/22 |

FOREIGN PATENT DOCUMENTS

JP 2002-073527 3/2002

* cited by examiner

*Primary Examiner* — Eron J Sorrell
*Assistant Examiner* — Dean Phan
(74) *Attorney, Agent, or Firm* — McDermott Will & Emery LLP

(57) ABSTRACT

A DMA transfer control device includes a setting register group for setting transfer informations, a number-of-transfers register to which the number of transfers to be performed is set, and which updates a value thereof every time one DMA transfer is completed, a transfer control unit, a secondary setting register group for setting other transfer informations different from the transfer informations, and a specified ordinal-number-of-transfer register. Every time one DMA transfer is initiated, either a value of the setting register group or a value of the secondary setting register group is selected for each of the transfer informations in accordance with a result of an arithmetic operation between a value of the number-of-transfers register and a value of the specified ordinal-number-of-transfer register, and inputted to the transfer control unit. As a result, by making settings for one DMA transfer, it is possible to temporarily change the transfer informations.

11 Claims, 10 Drawing Sheets

DMA TRANSFER CONTROL DEVICE

CROSS REFERENCE TO RELATED APPLICATIONS

This Non-Provisional application claims priority under 35 U.S.C. §119(a) on patent application Ser. No. 2007-327888 filed in Japan on Dec. 19, 2007, the entire contents of which are hereby incorporated by reference.

BACKGROUND OF THE INVENTION

The present invention relates to a DMA transfer control device for transferring data between devices.

Conventionally, a DMA transfer method for performing a direct data transfer between transfer devices without the intervention of a CPU has been widely known, and used to allow, e.g., a data transfer from one memory to another to be performed directly between the memories.

In a DMA transfer, a transfer operation is executed in such a manner that information necessary for the transfer, such as a data transfer source initiation address, a data transfer destination initiation address, and a data transfer size, is set to a register or the like in a DMA transfer control device, and then a CPU or the like controls the initiation of the transfer. During the transfer, the CPU need not control the transfer. Accordingly, the data transfer can be performed at a higher speed than in the case where the transfer is performed via the CPU, and a load on the CPU can be reduced. When the transfer of data equivalent to the transfer size which is set to the register or the like is completed, a DMA transfer complete interrupt is asserted in accordance with the setting of the DMA transfer control device. On sensing the DMA transfer complete interrupt, the CPU reads information from the register or the like in the DMA transfer control device, and monitors the result of the DMA transfer and the status thereof.

A DMA transfer is mostly used in the case where a plurality of transfer requests are sent, and the same content is transferred or a plurality of DMA transfers are performed from the subsequent addresses. For example, when data is transferred from a peripheral device to a memory, a transfer request is issued after checking the amount of data stored in the FIFO butter of the peripheral device, and a DMA transfer is performed in response to the issued transfer request. This process is performed by the determined total number of transfers.

In the structure described above, when an interrupt is generated in the CPU every time one DMA transfer is completed, transfer informations need to be set every time the interrupt is generated so that transfer efficiency deteriorates. In addition, when data is accumulated in the FIFO buffer before a DMA transfer is performed by re-setting transfer informations to the DMA control device, the FIFO buffer incurs an overflow so that a problem occurs in system.

To counteract such a problem, there has been proposed a conventional DMA transfer control device described in Japanese Laid-Open Patent Publication No. 2002-73527. In the DMA transfer control device, a DMA transfer is repeatedly performed by the number of times set to a number-of-transfers register. Specifically, as shown in FIG. 11, there are provided a CYC register 60 for setting the number of data transfers to be performed in response to one DMA transfer request, a CYC counter 61 for counting the number of data transfers that have been performed, and a TRN counter 52 for updating a value held therein every time the data transfers, the number of which equals the number held in the CYN resister 60, are performed. The data transfers are performed by repeating the operation describe above till the TRN counter 62 reaches a predetermined number.

In the conventional transfer control device, the total amount of data transferred by DMA is given by multiplying the set value (A) in the CYC register 60 by the set value (B) in the TRN counter 62. However, the total amount of data to be transferred by DMA is not necessarily an integral multiple of the set value (A). Accordingly, the total amount of data to be transferred by DMA does not match the product (A)×(B) of the set values (A) and (B), and a fraction may occur occasionally. To implement a transfer at this time, there can be considered the following methods.

1. After data corresponding to the product (A)×(B) is completely transferred, an interrupt is issued to the CPU such that settings are made again for the transfer of data in an amount corresponding to the fraction, and the transfer is executed.

2. The set values are changed so as to reduce the amount of data to be transferred in accordance with the fraction, and provide (A')×(B').

3. In addition to the DMA transfer, a dummy transfer is also performed to adjust the total amount of data to be transferred by DMA to the product value (A)×(B).

However, each of the methods mentioned above also has disadvantages. For example, in the method 1 mentioned above, it is necessary to make settings again for the transfer of data corresponding to the fraction after the data other than that corresponding to the fraction is transferred. This involves the additional trouble of setting software. On the other hand, in the method 2 mentioned above, the amount of data which can be transferred by issuing one DMA transfer request is reduced so that the speed of the transfer is also reduced. In addition, there is also a case where, because the transfer speed is less than a required value, data overflows and cannot be retrieved. Further, in the method 3, required data is overwritten by another data as a result of a dummy transfer.

In the prior art technology described above, every time a DMA transfer request is issued, the same setting register is used for a DMA transfer performed in response to the DMA transfer request, and a transfer source initiation address, a transfer destination initiation address, and the like are also fixed or continued from those in the previous DMA transfer. Accordingly, in the case where the amount of data to be transferred is intended to be temporarily changed, or a transfer address is intended to be changed, the settings cannot be flexibly changed.

SUMMARY OF THE INVENTION

It is therefore an object of the present invention to provide a higher-performance DMA transfer control device which is free of the disadvantages mentioned above, and which allows set informations to be flexibly changed so as to implement various transfers involving a friction.

To attain the object described above, the present invention adopts a structure in which a secondary setting register for setting intended transfer informations to which original transfer informations are changed, and the original transfer informations and the intended transfer informations can be switched appropriately depending on the ordinal number or position of a transfer in a series of transfers.

Specifically, a DMA transfer control device according to the present invention includes: a setting register group for setting transfer informations; a number-of-transfers register to which the number of transfers to be performed is set, and which updates a value thereof every time a DMA transfer is completed; a transfer control unit; a secondary setting register group for setting other transfer informations different from the transfer informations; and a specified ordinal-number-of-transfer register, wherein every time a DMA transfer is initiated, either a value of the setting register group or a value of the secondary setting register group is selected for each of the transfer informations in accordance with a result of an arithmetic operation between a value of the number-of-transfers register and a value of the specified ordinal-number-of-transfer register, and inputted to the transfer control unit.

Therefore, in the DMA transfer control device according to the present invention, values are set to the various registers prior to the initiation of a DMA transfer. Then, when the DMA transfer is initiated in response to a transfer request, the arithmetic operation is performed first using the current value of the number-of-transfers register, and the value of the specified ordinal-number-of-transfer register. The setting register group or the secondary setting register group is selected in accordance with the result of the arithmetic operation, and the value of the register is inputted to the transfer control unit. A content to be selected may be different from one transfer information to another such as a transfer source initiation address, a transfer destination initiation address, a transfer size, or a transfer mode. When one DMA transfer is completed, the value of the number-of-transfers register is updated, and an arithmetic operation is performed again to determine the value of the register to be used during a next DMA transfer. When the number-of-transfers register reaches a predetermined value of 0 or the like, the DMA transfer is completed, and an interrupt is outputted to a CPU. As a result, it is possible to change the settings of the transfer informations only in a transfer with a specified ordinal number by merely making settings for one DMA transfer.

In an embodiment of the DMA transfer control device according to the present invention, the specified ordinal-number-of-transfer register and the secondary setting register group include a plurality of the specified ordinal-number-of-transfer registers and a plurality of the secondary setting register groups, respectively, and the value of the setting register group and the value of any of the plurality of specified ordinal-number-of-transfer register groups are selected for each of the transfer informations.

Therefore, in the DMA transfer control device according to the present embodiment, by merely making settings for one DMA transfer, it is possible to change the settings to the different transfer informations in each of transfers with a plurality of ordinal numbers.

In an embodiment of the DMA transfer control device according to the present invention, any or all of a transfer size, a transfer source initiation address, a transfer destination initiation address, and a transfer mode are stored in the setting register group.

Therefore, in the present embodiment, by merely making settings for one DMA transfer, it is possible to implement a transfer when the total number of transfers is not an integral multiple of the transfer size, data merging from a plurality of addresses, or data distribution to a plurality of addresses through the replacement of the transfer size, the transfer source initiation address, and the transfer destination initiation address. By setting a transfer mode in a transfer with a certain ordinal number to a fixed transfer source initiation address, it is possible to obtain data at a specified address again, and transfer the obtained data to a transfer destination initiation address by merely making settings for one DMA transfer.

In an embodiment of the DMA transfer control device according to the present invention, a match/mismatch between the value of the number-of-transfers register and the value of the specified ordinal-number-of-transfer register is determined by the arithmetic operation.

Therefore, in the present embodiment, it is possible to easily change the settings of a transfer with a desired ordinal number.

In an embodiment of the DMA transfer control device according to the present invention, any of bits in the number-of-transfers register and the value of the specified ordinal-number-of-transfer register are used for the arithmetic operation.

Therefore, in the present embodiment, it is possible to periodically change the result of the arithmetic operation.

In an embodiment of the present invention, the DMA transfer control device further includes: an arithmetic operation register for determining a content of the arithmetic operation.

Therefore, in the present embodiment, it is possible to change the content of the arithmetic operation midway during the transfer, and change the content of the arithmetic operation from one channel to another.

In an embodiment of the DMA transfer control device according to the present invention, the setting register group, the number-of-transfers register, and the specified ordinal-number-of-transfer register are provided for each of a plurality of channels, and the setting register group to be used, the number-of-transfers register to be used, and the specified ordinal-number-of-transfer registers to be used are changed from one channel to another.

Therefore, in the present embodiment, it is possible to commonly use the specified ordinal-number-of-transfer registers and the secondary setting register group among the plurality of channels.

In an embodiment of the DMA transfer control device according to the present invention, it is controlled for each of the channels whether the arithmetic operation is to be performed or the value of the setting register group corresponding to the channel is to be used.

Therefore, in the present embodiment, it is possible to change set information only in a specified channel.

In an embodiment of the DMA transfer control device according to the present invention, the secondary setting register group has a secondary transfer size register, when the value of the number-of-transfers register does not indicate a final DMA transfer, a value of a transfer size register of the setting register group is inputted to the transfer control unit, and, when the value of the number-of-transfers register indicates the final DMA transfer, a value of the secondary transfer size register is inputted to the transfer control unit.

Therefore, in the present embodiment, by setting the fraction of the value of the transfer size register to the secondary transfer size register, a transfer when the total number of transfers is not an integral multiple of the transfer size is allowed by making settings for one DMA transfer. In addition, the arithmetic operation for using the secondary transfer register group also becomes easy.

A data transfer apparatus according to the present invention includes: the DMA transfer control device mentioned above; and a peripheral device as a transfer source or a transfer destination of the DMA transfer control device.

Therefore, in the data transfer apparatus according to the present invention, the value of the transfer size in one DMA transfer is determined by the setting of a peripheral device. Even a DMA transfer in which the total number of transfers is not an integral multiple of the value of the transfer size can be implemented by making settings for one DMA transfer.

DETAILED DESCRIPTION OF THE INVENTION

Figure 1:
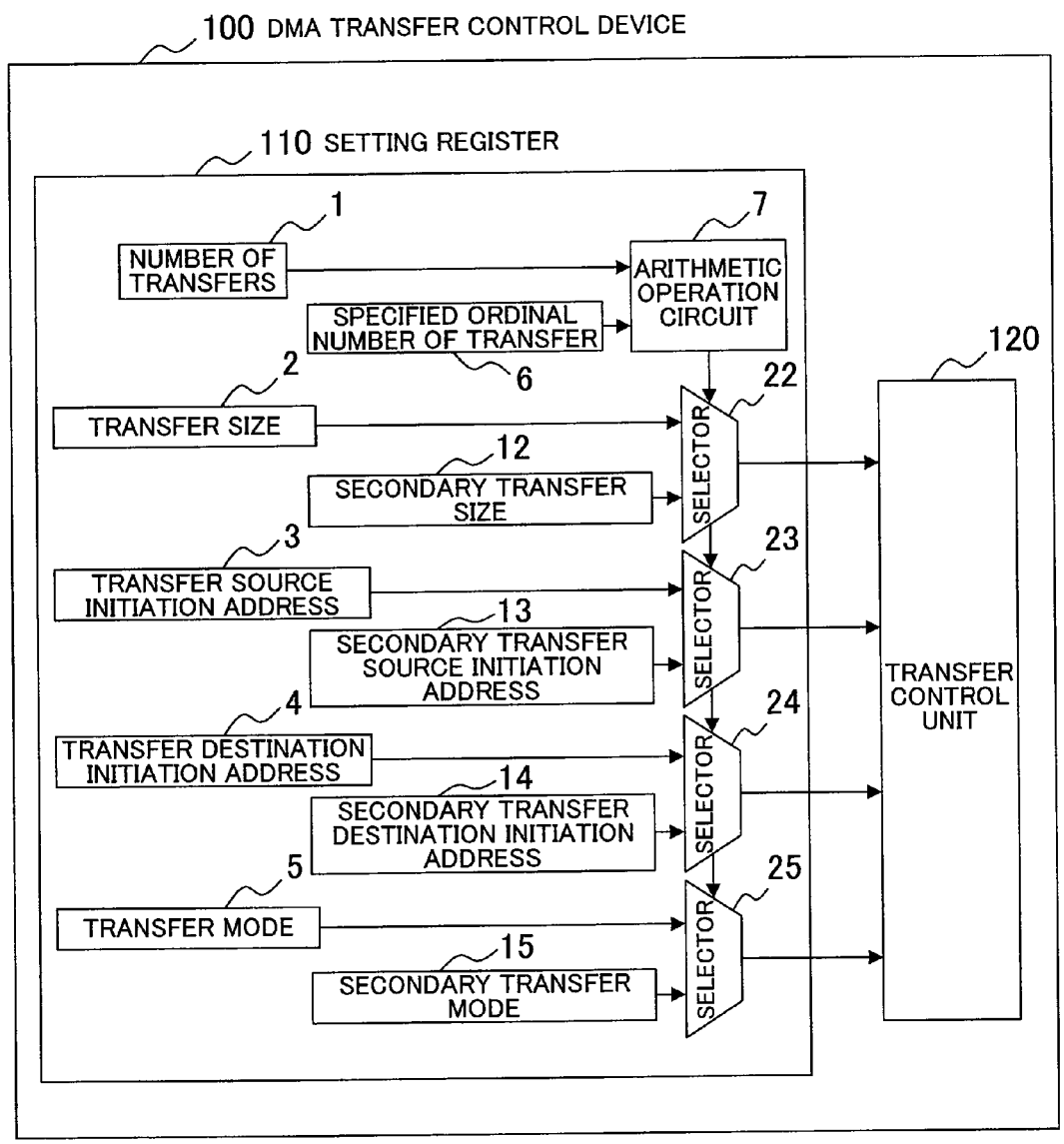
FIG. 1 is a block diagram showing a schematic structure of a DMA transfer control device according to a first embodiment of the present invention.

Referring now to the drawings, the individual preferred embodiments of a DMA transfer control device according to the present invention will be described hereinbelow. A method and a structure used in each of the embodiments of the present invention are only exemplary, and the present invention is not limited thereto.

Embodiment 1

FIG. 1 is a block diagram showing a schematic structure of a DMA transfer control device 100 in the first embodiment of the present invention.

In FIG. 1, 110 is a setting register for storing transfer information, and 120 is a transfer control unit for controlling a data transfer based on information inputted from the setting register 110.

In the setting register 110, there are five registers of a number-of-transfers register 1, a transfer size register 2, a transfer source initiation address register 3, a transfer destination initiation address register 4, and a transfer mode register 5. The number of transfers, a transfer size, a transfer source initiation address, a transfer destination initiation address, and a transfer mode stored in these registers are basic transfer informations. For the convenience of description, these basic transfer informations are also provided with the same reference numerals as those of the registers storing the basic transfer informations.

In the setting register 110, there are provided a specified ordinal-number-of-transfer register 6 for specifying the ordinal number or position of a transfer in a series of transfers, and an arithmetic operation circuit 7 for receiving the number of transfers 1 and the specified ordinal number of transfer 6, and performing an arithmetic operation. In the setting register 110, there are further provided other four registers as registers for storing secondary transfer informations, which are a secondary transfer size register 12, a secondary transfer source initiation address register 13, a secondary transfer destination initiation address register 14, and a secondary transfer mode register 15. Secondary transfer informations (a secondary transfer size, a secondary transfer source initiation address, a secondary transfer destination initiation address, and a secondary transfer mode) as well as the specified ordinal number of transfer will also be described by providing them with the same reference numerals as those of the registers storing the secondary transfer informations.

Further, in FIG. 1, 22 is a selector for selecting either the transfer size 2 or the secondary transfer size 12 in accordance with an output of the arithmetic operation circuit 7, and outputting the selected transfer size to the transfer control unit 120, 23 is a selector for selecting either the transfer source initiation address 3 or the secondary transfer source initiation address 13 in accordance with the output of the arithmetic operation circuit 7, and outputting the selected initiation address to the transfer control unit 120, 24 is a selector for selecting either the transfer destination initiation address 4 or the secondary transfer destination initiation address 14, and outputting the selected initiation address to the transfer control unit 120, and 25 is a selector for selecting either the transfer mode 5 or the secondary transfer mode 15 in accordance with the output of the arithmetic operation circuit 7, and outputting the selected transfer mode to the transfer control unit 120.

The various registers provided in the setting register 110 storing the information necessary for a transfer are not limited thereto. For example, it is also possible to construct the various registers such that the transfer information is given by a different method in which, e.g., the transfer information is received from an external terminal or the like. The basic transfer informations selected for a transfer are not limited to those mentioned above. The basic transfer informations also include additional information needed to perform a high-level transfer such as the size of a region continued to a transfer destination, a transfer source data width, and a transfer destination data width.

A description will be given to an operation of the DMA transfer control device according to the present embodiment thus constructed.

Prior to the initiation of a DMA transfer, values are set to the various registers provided in the setting register 110. To the number-of-transfers register 1, the number of DMA transfers to be performed in the transfer control unit 120 is set. Informations for a DMA transfer actually performed in the transfer control unit 120 are set to the basic transfer informations (the transfer size 2, the transfer source initiation address 3, the transfer destination initiation address 4, and the transfer mode 5), while the transfer informations to which the basic transfer informations are intended to be temporarily changed are set to the secondary transfer informations (the secondary transfer size 12, the secondary transfer source initiation address 13, the secondary transfer destination initiation address 14, and the secondary transfer mode 15).

To the specified ordinal-number-of-transfer register 6, the ordinal number (value showing the ordinal number or position of a transfer in a series of transfers) of a transfer intended to be performed in accordance with the secondary transfer informations (the secondary transfer size 12, the secondary transfer source initiation address 13, the secondary transfer destination initiation address 14, and the secondary transfer mode 15) is set.

When a DMA transfer request is received and the DMA transfer is initiated, the setting register 110 sends necessary information to the transfer control unit 120. At this time, the arithmetic operation circuit 7 compares the number of transfers 1 with the specified ordinal number of transfer 6. When the result of the comparison is a mismatch, the selectors 22 to 25 select the basic transfer informations (the transfer size 2, the transfer source initiation address 3, the transfer destination initiation address 4, and the transfer mode 5), and output the selected basic transfer informations to the transfer control unit 120. On the other hand, when the result of the comparison is a match, the selectors 22 to 25 select the secondary transfer informations (the secondary transfer size 12, the secondary transfer source initiation address 13, the secondary transfer destination initiation address 14, and the secondary transfer mode 15), and output the selected secondary transfer informations to the transfer control unit 120.

At this time, it is unnecessary to use the secondary transfer informations as all the transfer informations. It is also possible for the selectors 22 to 25 to make different selections, and mix the basic transfer informations with the second transfer informations.

In the transfer control unit 120, the DMA transfer is performed in accordance with the contents of the obtained transfer informations. When the DMA transfer is completed, the transfer control unit 120 notifies the setting register 110 of the completion of the DMA transfer, and subtracts one from the number of transfers 1. When necessary, the transfer control unit 120 updates the transfer source initiation address 3 and the transfer destination initiation address 4. When a next DMA transfer request is received, the number of transfers 1 is compared again with the specified ordinal number of transfer 6 so that the transfer informations to be inputted to the transfer control unit 120 are determined. When the number of transfers 1 reaches zero, a complete interrupt is outputted to notify the CPU, and all the transfers are completed.

The description given above is only exemplary, and not restrictive. For example, the complete interrupt is not necessarily in the form of an interrupt, and a different method may also be adopted in which, e.g., the registers in the DMA transfer control device are polled. A DMA transfer request may also be issued by a different control operation, or a control operation which does not require a DMA transfer request may also be performed.

With the structure described above, a DMA transfer can be performed in the present embodiment using the secondary transfer informations, not the basic transfer informations, in accordance with the result from the arithmetic operation circuit 7. As a result, it is possible to flexibly temporarily change the settings of the transfer information by merely making settings for one DMA transfer.

In addition, by causing the arithmetic operation circuit 7 to make a comparison match between the number of transfers 1 and the specified ordinal number of transfer 6 through an arithmetic operation, the transfer information can be changed only in the transfer with the set specified ordinal number.

Embodiment 2

Figure 2:
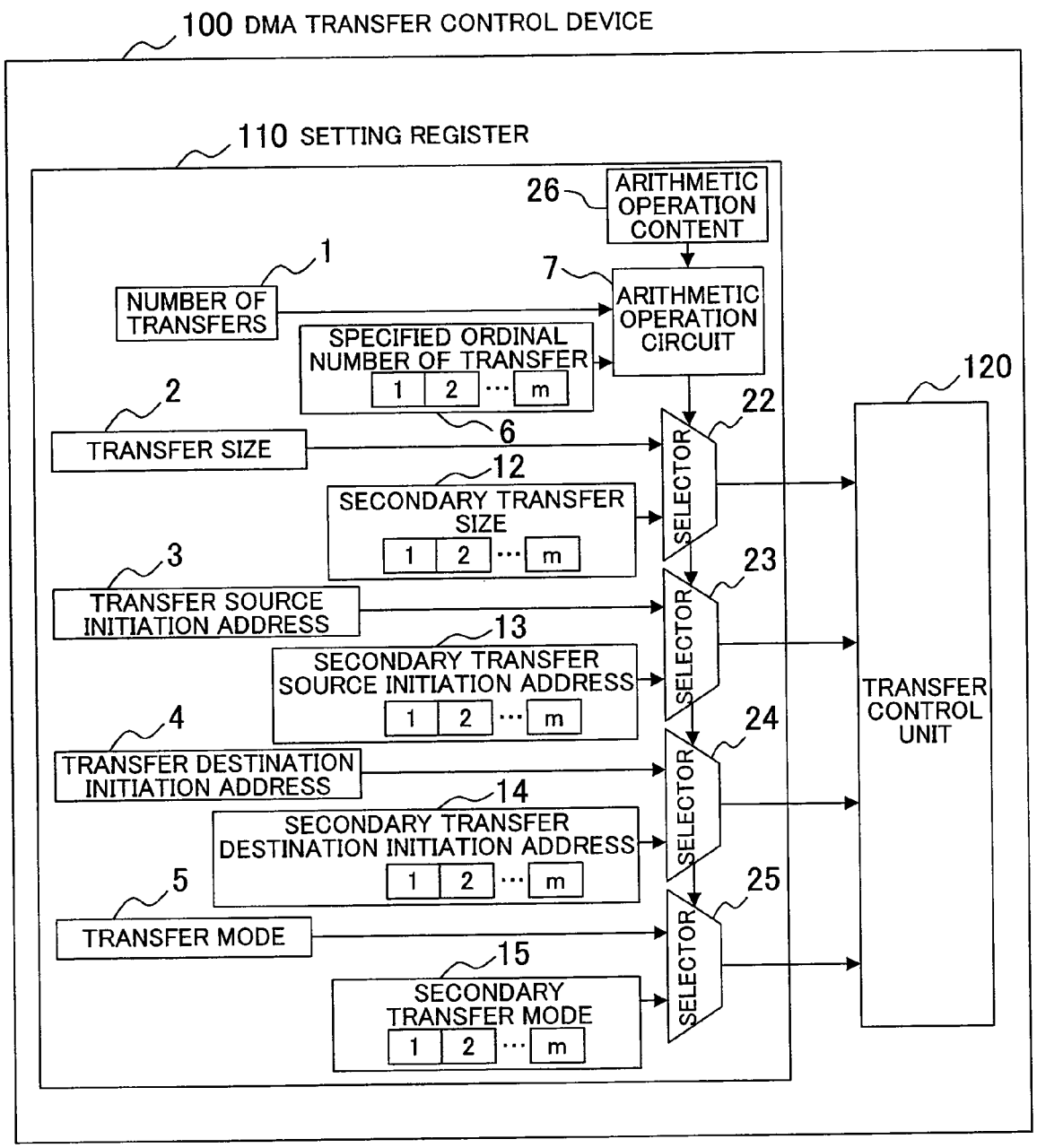
FIG. 2 is a block diagram showing a schematic structure of a DMA transfer control device according to a second embodiment of the present invention.

FIG. 2 is a block diagram showing a schematic structure of a DMA transfer control device 100 in the second embodiment of the present invention.

The structure of a DMA transfer control device 100 according to the present embodiment is such that, in addition to the components of FIG. 1 according to the first embodiment described above, an arithmetic operation content register 26 for specifying an arithmetic operation performed in the arithmetic operation circuit 7 is provided, while a plurality of specified ordinal numbers of transfers 6 and a plurality of each of the secondary transfer informations (the secondary transfer size 12, the secondary transfer source initiation address 13, the secondary transfer destination address 14, and the secondary transfer mode 15) are provided. Each of the number of the specified ordinal numbers of transfers 6 and the number of each of the secondary transfer informations is m.

Next, a description will be given to an operation of the DMA transfer control device thus constructed.

The specified ordinal-number-of-transfer register 6 inputs the plurality of specified ordinal numbers 1 to m to the arithmetic operation circuit 7.

In the arithmetic operation circuit 7, an arithmetic operation is performed based on the content of the arithmetic operation set in the arithmetic content register 26 by referencing the plurality of specified ordinal numbers of transfers 6 that have been received. An output of the arithmetic operation circuit 7 can show not only truth or falseness, but also the result having a bit width including a plurality of bits.

The selectors 22 to 25 select either the basic transfer informations (the transfer size 2, the transfer source initiation address 3, the transfer destination initiation address 4, and the transfer mode 5) or any of the plurality of secondary transfer informations (secondary transfer size 12, the secondary transfer source initiation address 13, the secondary transfer destination initiation address 14, and the secondary transfer mode 15) 1 to m of a transfer execution channel in accordance with the output of the arithmetic operation circuit 7, and outputs the selected transfer informations to the transfer control unit 120.

The description given above is only exemplary, and not restrictive. For example, the number of registers provided may be different from one transfer information to another. In the selectors 22 to 25, the basic transfer informations and the plurality of secondary transfer informations 1 to m may be present in mixed relation by providing the selectors 22 to 25 with different structures. The operation is otherwise the same as in the first embodiment.

With the structure described above, it is possible in the present embodiment to change the secondary transfer informations to be used depending on the plurality of the ordinal numbers of transfers, and temporarily change the transfer informations to different ones by merely making settings for one DMA transfer. The arithmetic operation information may also be changed by referencing another factor such as a change in the number of transfers 1.

By setting the making of a comparison match between the number of transfers 1 and the plurality of specified ordinal numbers of transfers 6 through an arithmetic operation to the arithmetic content register 26, and causing the arithmetic operation circuit 7 to make a comparison match therebetween through an arithmetic operation, it is possible to easily change the transfer informations to different ones only in transfers with the plurality of set ordinal numbers of transfers 6.

By further setting the arithmetic operation content register 26 such that the output of the arithmetic operation circuit 7 causes the selectors 22 to 25 to select only the basic transfer informations, it becomes possible to use only the basic transfer informations without temporarily changing the transfer informations.

Embodiment 3

Figure 3:
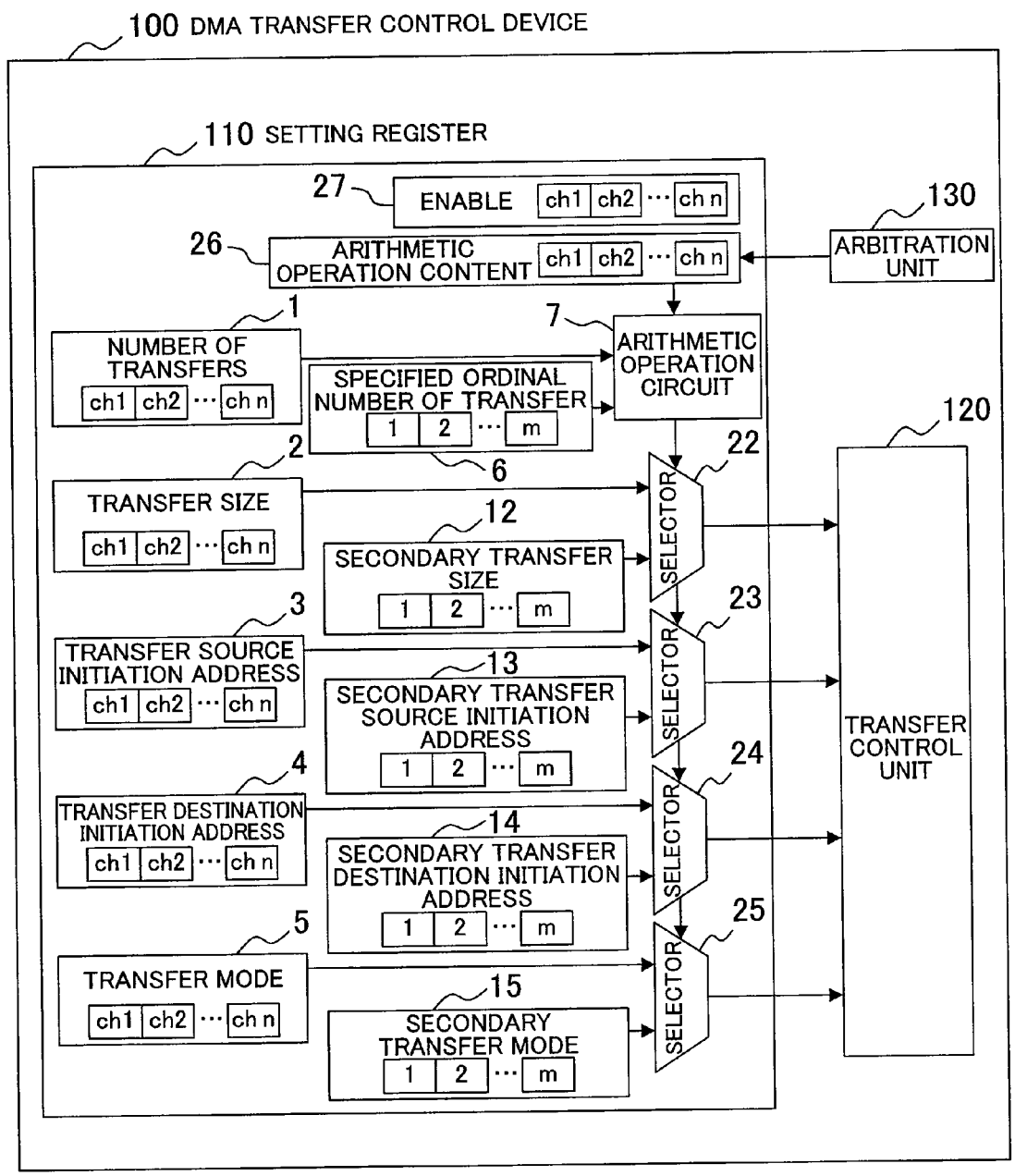
FIG. 3 is a block diagram showing a schematic structure of a DMA transfer control device according to a third embodiment of the present invention.

FIG. 3 is a block diagram showing a schematic structure of a DMA transfer control device 100 in the third embodiment of the present invention.

The structure of a DMA transfer control device 100 according to the present embodiment is such that, in addition to the components of FIG. 1 according to the first embodiment described above, an arbitration unit 130 for determining a channel where a transfer is executed, a plurality of the arithmetic operation content registers 26 each for specifying an arithmetic operation performed in the arithmetic operation circuit 7, and a plurality of enable registers 27 each for determining whether or not the transfer informations are to be changed are provided. Each of the number of the arithmetic operation content registers 26 and the number of the enable registers 27 corresponds to the number (n) of channels. In the structure, a plurality of the numbers of transfers 1, a plurality of each of the basic transfer informations (the transfer size 2, the transfer source initiation address 3, the transfer destination initiation address 4, and the transfer mode 5), a plurality of the specified ordinal numbers of transfers 6, and a plurality of each of the secondary transfer informations (the secondary transfer size 12, the secondary transfer source initiation address 13, the secondary transfer destination initiation address 14, and the secondary transfer mode 15) are provided. Each of the number of the numbers of transfers 1 and the number of each of the basic transfer informations corresponds to the number (n) of the channels. Each of the number of the specified ordinal numbers of transfers 6 and the number of each of the secondary transfer informations is m.

Next, a description will be given to an operation of the DMA transfer control device according to the present embodiment thus constructed.

As the basic transfer informations (the transfer size 2, the transfer source initiation address 3, the transfer destination initiation address 4, and the transfer mode 5), the basic transfer informations of a next transfer execution channel, which is determined by the arbitration unit 130, are used.

When the enable register 27 of the next transfer execution channel is in an OFF state, the transfer is performed using the basic transfer informations without temporarily changing the transfer informations.

The specified ordinal-number-of-transfer register 6 selects one or more among the specified ordinal numbers 1 to m in accordance with the transfer execution channel, and inputs the selected ordinal number or numbers to the arithmetic operation circuit 7.

In addition, the arithmetic content register 26 inputs the content of an arithmetic operation of the next transfer execution channel determined by the arbitration unit 130 to the arithmetic operation circuit 7. An output of the arithmetic operation circuit 7 can show not only truth or falseness, but also the result having a bit width including a plurality of bits.

The selectors 22 to 25 select either the basic transfer informations (the transfer size 2, the transfer source initiation address 3, the transfer destination initiation address 4, and the transfer mode 5) or any of the plurality of secondary transfer informations (secondary transfer size 12, the secondary transfer source initiation address 13, the secondary transfer destination initiation address 14, and the secondary transfer mode 15) 1 to m of a transfer execution channel in accordance with the output of the arithmetic operation circuit 7, and outputs the selected transfer informations to the transfer control unit 120.

The description given above is only exemplary, and not restrictive. For example, the number of registers provided may be different from one transfer information to another. In the selectors 22 to 25, the basic transfer informations and the plurality of secondary transfer informations 1 to m of the transfer execution channel may be present in mixed relation by providing the selectors 22 to 25 with different structures. It is also possible to determine the content of the arithmetic operation by inputting the transfer execution channel determined by the arbitration unit 13 directly to the arithmetic operation circuit 7 without using the arithmetic operation content register 26. By further setting the arithmetic operation content register 26 such that the output of the arithmetic operation circuit 7 causes the selectors 22 to 25 to select only the basic transfer informations, it becomes possible to use only the basic transfer informations without using the enable register 27 and without temporarily changing the transfer informations. The operation is otherwise the same as in the first embodiment.

With the structure described above, it is possible in the present embodiment to change the basic transfer informations, the content of the arithmetic operation between the number of transfers and the specified ordinal number of transfer, and the secondary transfer informations to be used every time the transfer execution channel is changed by merely making settings for one DMA transfer. The arithmetic operation information may also be changed by referencing not only the changing of the channels, but also another factor such as a change in the number of transfers 1.

By giving the plurality of specified ordinal numbers of transfers 6 to obtain a plurality of outputs, and using the plurality of secondary transfer informations, it is possible to temporarily change the transfer informations to the plurality of different transfer informations by merely making settings for one DMA transfer.

By further setting the arithmetic operation content register 26 such that the output of the arithmetic operation circuit 7 causes the selectors 22 to 25 to select only the basic transfer informations, it becomes possible to use only the basic transfer informations without temporarily changing the transfer informations in an arbitrary transfer execution channel.

Embodiment 4

Figure 4:
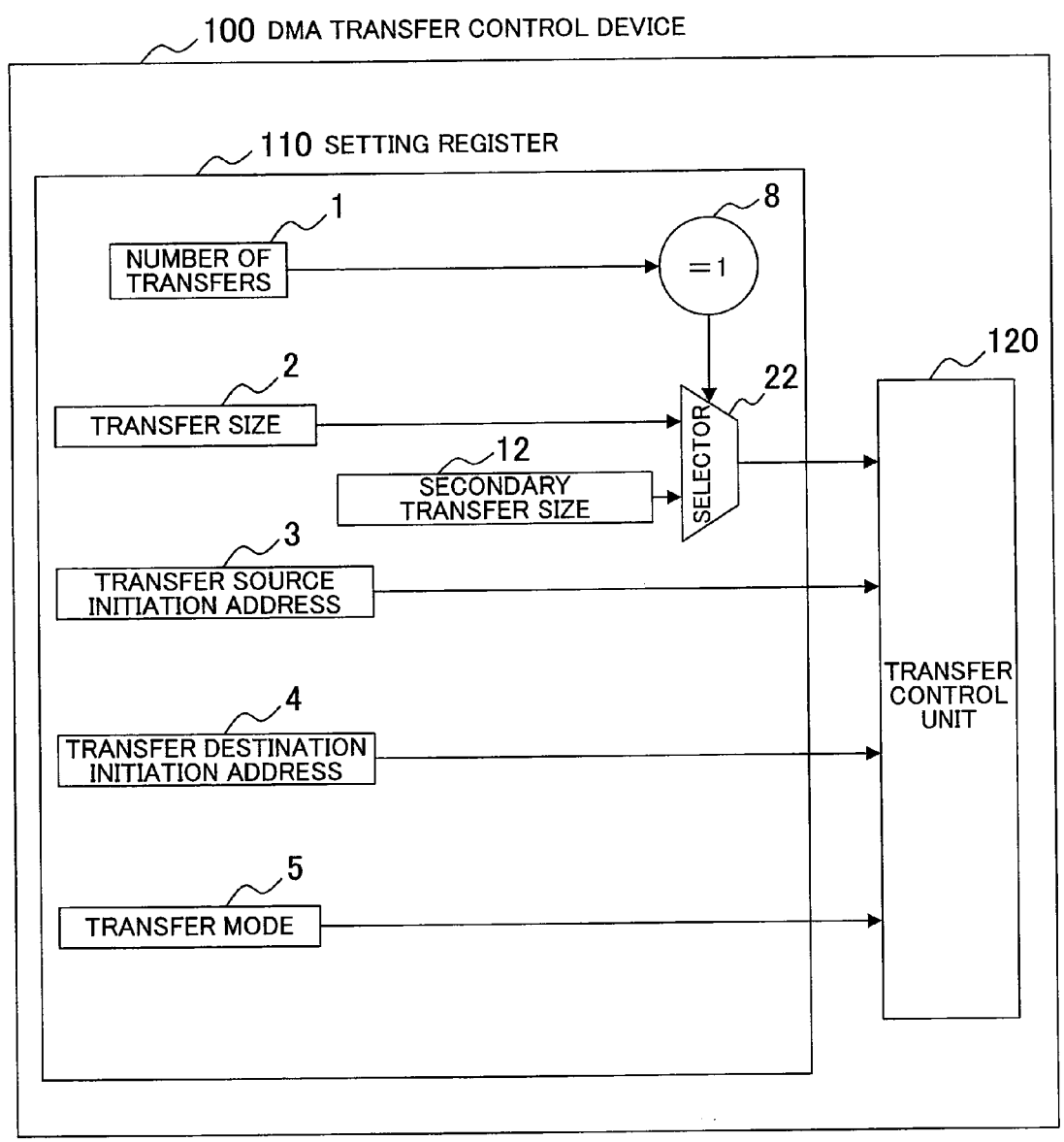
FIG. 4 is a block diagram showing a schematic structure of a DMA transfer control device according to a fourth embodiment of the present invention.
Figure 5:
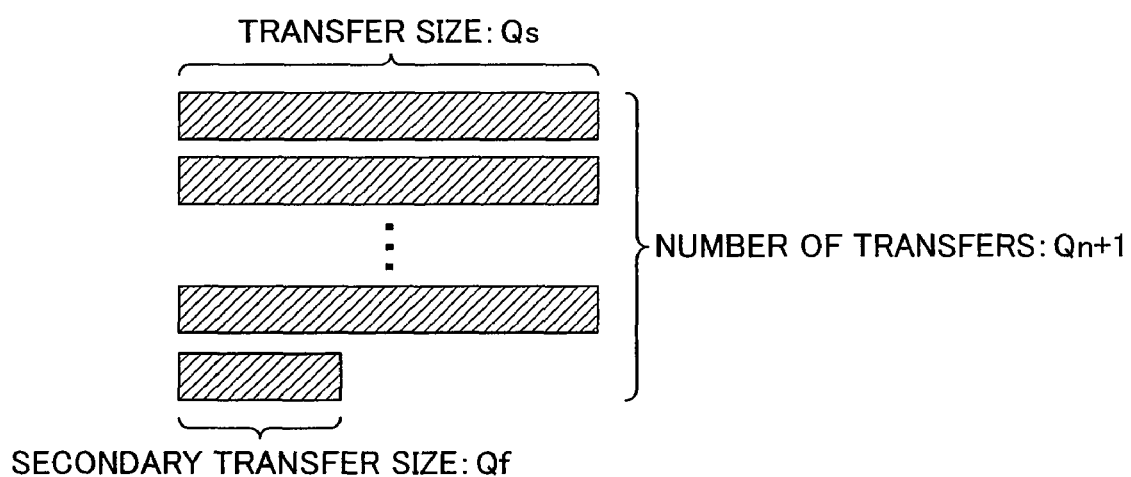
FIG. 5 is a view showing the relationship between the total number of transfers and a setting register in the fourth embodiment.

FIG. 4 is a block diagram showing a schematic structure of a DMA transfer control device 100 in the fourth embodiment of the present invention.

In FIG. 4, 110 is a setting register for storing transfer information, and 120 is a transfer control unit for controlling a data transfer based on information inputted from the setting register 110.

Basic transfer information stored in the setting register 110 includes five informations of the number of transfers 1, a transfer size 2, a transfer source initiation address 3, a transfer destination initiation address 4, and a transfer mode 5.

There is also a determination circuit 8 for determining whether or not the value of the transfer size 2 is one. As another secondary transfer information, there is a secondary transfer size 12. 22 is a selector for selecting either the transfer size 2 or the secondary transfer size 12 in accordance with an output of the determination circuit 8, and outputs the selected transfer size to the transfer control unit 120.

The various registers provided in the setting register 110 storing the information necessary for a data transfer are not limited thereto. For example, it is also possible to construct the various registers such that the transfer information is given by a different method in which, e.g., the transfer information is received from an external terminal or the like. The basic transfer informations selected for a data transfer are not limited to those mentioned above. The basic transfer informations also include additional information needed to perform a high-level transfer such as the size of a region continued to a transfer destination, a transfer source data width, and a transfer destination data width.

A description will be given to an operation of the DMA transfer control device according to the present embodiment thus constructed.

Prior to the initiation of a DMA transfer, values are set to the various registers provided in the setting register 110. To the number-of-transfers register 1, the number of DMA transfers to be performed in the transfer control unit 120 is set. Informations for a DMA transfer actually performed in the transfer control unit 120 are set to the transfer size 2, the transfer source initiation address 3, the transfer destination initiation address 4, and the transfer mode 5. At this time, when the total number of transfers to be performed does not match an integral multiple of the transfer size 2, i.e., when the total number of transfers is given by $Qsum=Qs \times Qn+Qf$ (where Qs is the transfer size), and a faction occurs, Qs is set to the transfer size 2, (Qn+1) is set to the number of transfers 1, and Qf as the faction is set to the secondary transfer size 12.

When a DMA transfer request is received and the DMA transfer is initiated, the setting register 110 sends necessary information to the transfer control unit 120. At this time, the determination circuit 8 determines whether or not the number of transfers 1 is one. When the result of the determination is a mismatch, the selector 22 selects the transfer size 2 as the basic transfer information, and outputs the selected transfer size 2 to the transfer control unit 120 such that only data of the transfer size Qs is transferred. When the result of the determination is a match, the selector 22 selects the secondary transfer size 12 as the secondary transfer information, and transfers the selected secondary transfer size 12 to the transfer control unit 120 such that only data corresponding to Qf is transferred.

The transfer source initiation address 3, the transfer destination initiation address 4, and the value of the transfer mode 5 are sent without any alteration to the transfer control unit 120.

In the transfer control unit 120, the DMA transfer is performed in accordance with the contents of the obtained transfer informations. When the DMA transfer is completed, the transfer control unit 120 notifies the setting register 110 of the completion of the DMA transfer, and subtracts one from the number of transfers 1. When necessary, the transfer control unit 120 updates the transfer source initiation address 3 and the transfer destination initiation address 4. When a next DMA transfer request is received, it is determined again whether or not the number of transfers 1 is one, and the transfer size to be inputted to the transfer control unit 120 is determined. When the number of transfers 1 reaches zero, a complete interrupt is outputted to notify the CPU, and all the transfers are completed.

The description given above is only exemplary, and not restrictive. For example, the complete interrupt is not necessarily in the form of an interrupt, and a different method may also be adopted in which, e.g., the registers in the DMA transfer control device are polled. A DMA transfer request may also be issued by a different control operation, or a control operation which does not require a DMA transfer request may also be performed.

With the structure described above, a DMA transfer can be performed in the present embodiment using the secondary transfer size 12, not the transfer size 2 in the final transfer. Therefore, even when the total number of transfers is not given by Number of Transfers×Transfer Size, and a faction occurs, it is sufficient to merely make settings for one DMA transfer. In addition, the DMA transfer can be implemented by only increasing a small number of hardware items.

Embodiment 5

Figure 6:
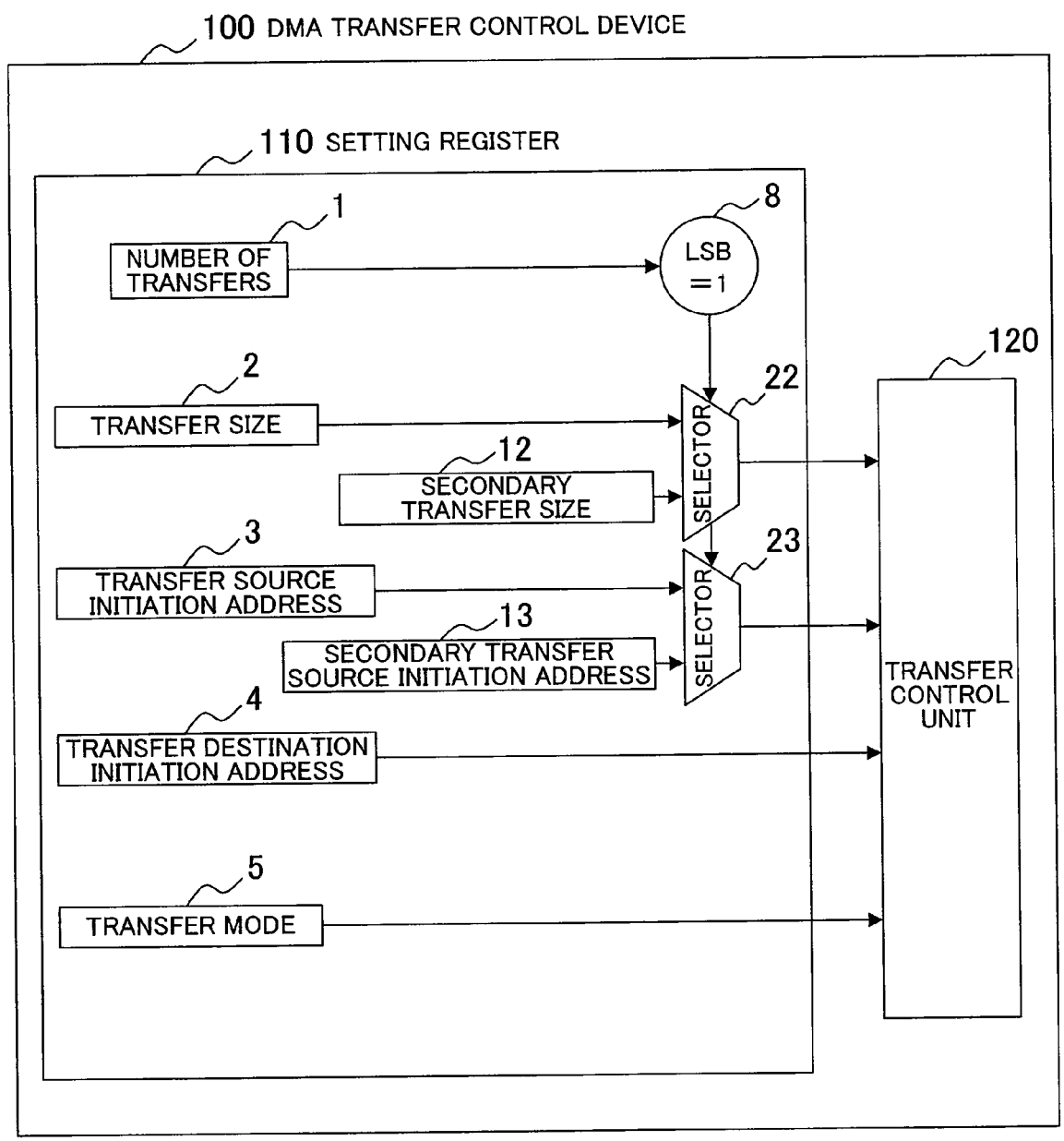
FIG. 6 is a block diagram showing a schematic structure of a DMA transfer control device according to a fifth embodiment of the present invention.

FIG. 6 is a block diagram showing a schematic structure of a DMA transfer control device 100 in the fifth embodiment of the present invention.

In FIG. 4, 110 is a setting register for storing the transfer information, and 120 is a transfer control unit for controlling a data transfer based on information inputted from the setting register 110.

Basic transfer informations stored in the setting register 110 include the number of transfers 1, a transfer size 2, a transfer source initiation address 3, a transfer destination initiation address 4, and a transfer mode 5.

There is also a determination circuit 8 for determining whether or not the least significant bit of the transfer size 2 is 1. As other secondary transfer informations, there are a secondary transfer size 12, and a secondary transfer source initiation address 13. 22 is a selector for selecting either the transfer size 2 or the secondary transfer size 12 in accordance with an output of the determination circuit 8, and outputs the selected transfer size to the transfer control unit 120. 23 is a selector for selecting either the secondary transfer source initiation address 3 or the secondary transfer source initiation address 13 in accordance with an output of the determination circuit 8, and outputs the selected transfer source initiation address to the transfer control unit 120.

The various registers provided in the setting register 110 storing the information necessary for a transfer are not limited thereto. For example, it is also possible to construct the various registers such that the transfer information is given by a different method in which, e.g., the transfer information is received from an external terminal or the like. The basic transfer informations selected for a transfer are not limited to those mentioned above. The basic transfer informations also include additional information needed to perform a high-level transfer such as the size of a region continued to a transfer destination, a transfer source data width, and a transfer destination data width.

A description will be given to an operation of the DMA transfer control device according to the present embodiment thus constructed.

Prior to the initiation of a DMA transfer, values are set to the various registers provided in the setting register 110. To the number-of-transfers register 1, the number of DMA transfers to be performed in the transfer control unit 120 is set. Informations for a DMA transfer actually performed in the transfer control unit 120 are set to the transfer size 2, the transfer source initiation address 3, the transfer destination initiation address 4, and the transfer mode 5. At this time, when data items at two transfer source initiation addresses are intended to be merged to one transfer destination initiation address, one of the transfer source initiation addresses is set to the secondary transfer source initiation address 13, and the transfer size intended to be obtained at this time is set to the secondary transfer size 12.

When a DMA transfer request is received and the DMA transfer is initiated, the setting register 110 sends necessary information to the transfer control unit 120. At this time, the determination circuit 8 determines whether or not the least significant bit of the number of transfers 1 is one. When the result of the determination is a mismatch, the selector 22 selects the transfer size 2, and outputs the selected transfer size 2 to the transfer control unit 120, while the selector 23 selects the transfer source initiation address 3, and outputs the selected transfer source initiation address 3 to the transfer control unit 120. When the result of the determination is a match, the selector 22 selects the secondary transfer size 12, and outputs the selected secondary transfer size 12 to the transfer control unit 120, while the selector 23 selects the secondary transfer source initiation address 13, and outputs the selected secondary transfer source initiation address 13 to the transfer control unit 120.

The transfer destination initiation address 4, and the value of the transfer mode 5 are sent without any alteration to the transfer control unit 120.

Figure 7:
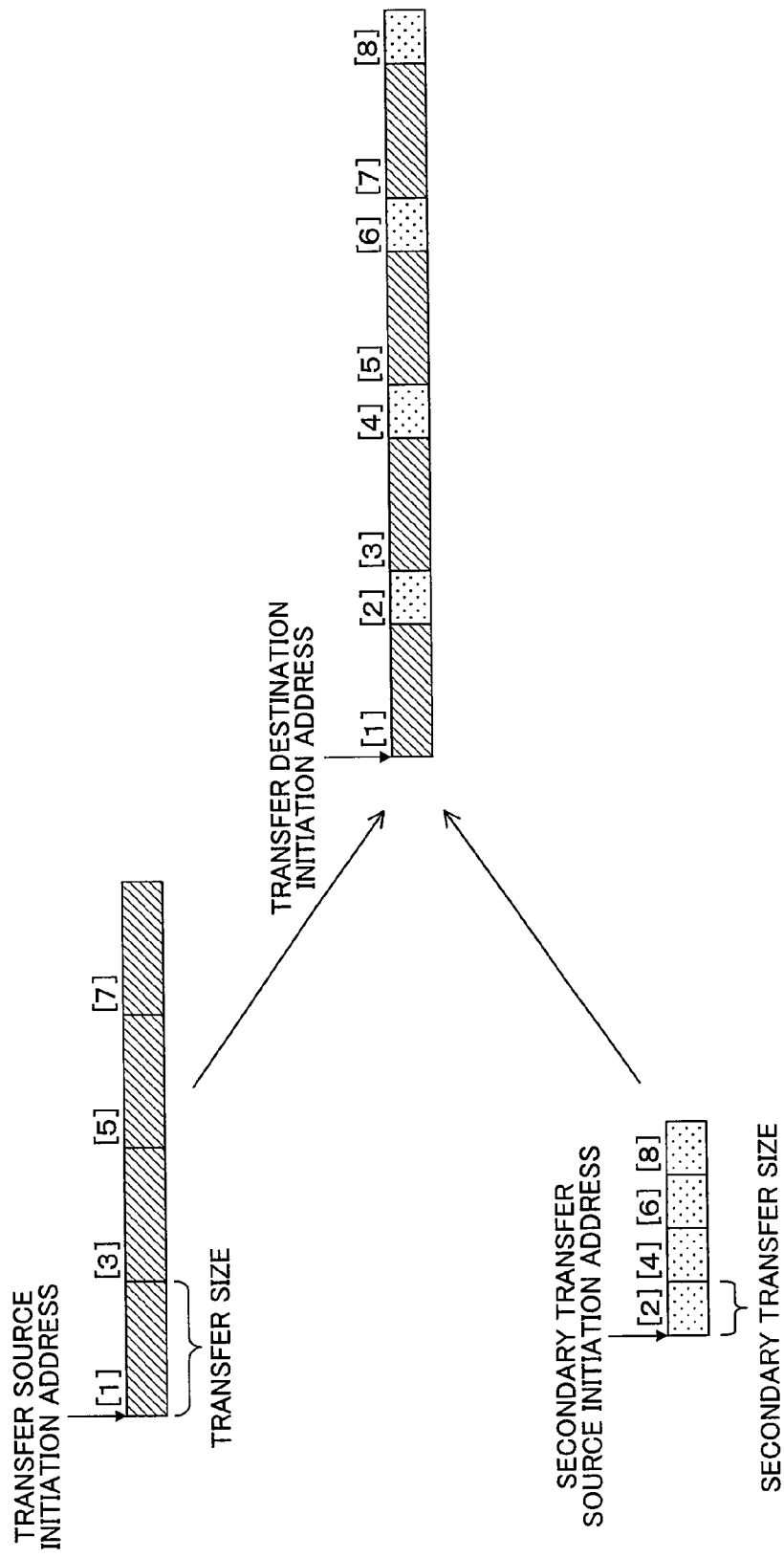
FIG. 7 is a view showing the relationship between data merging and the setting register in the fifth embodiment.
Figure 8:
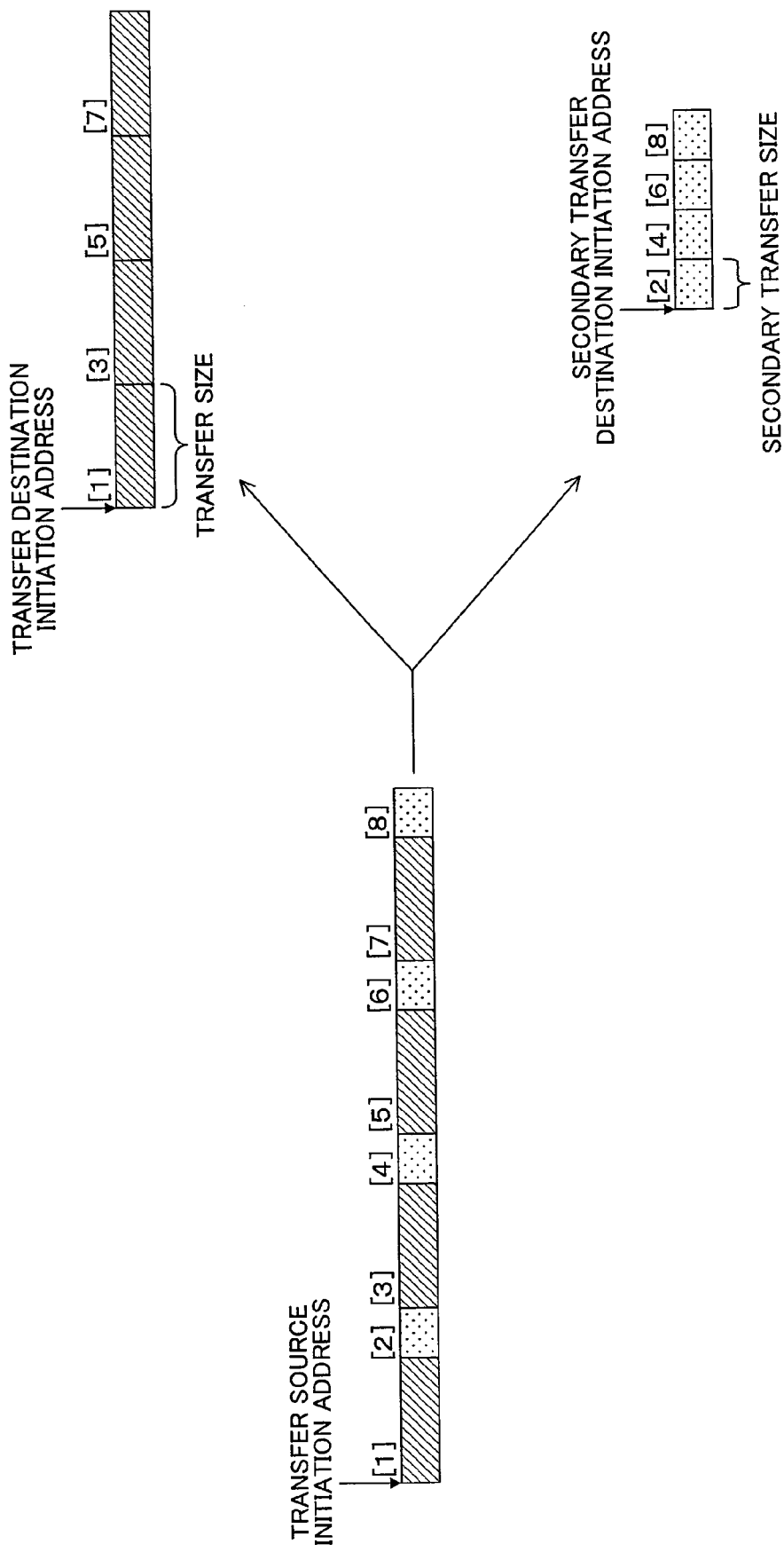
FIG. 8 is a view showing the relationship between data distribution and the setting register in a variation of the fifth embodiment.
Figure 9:
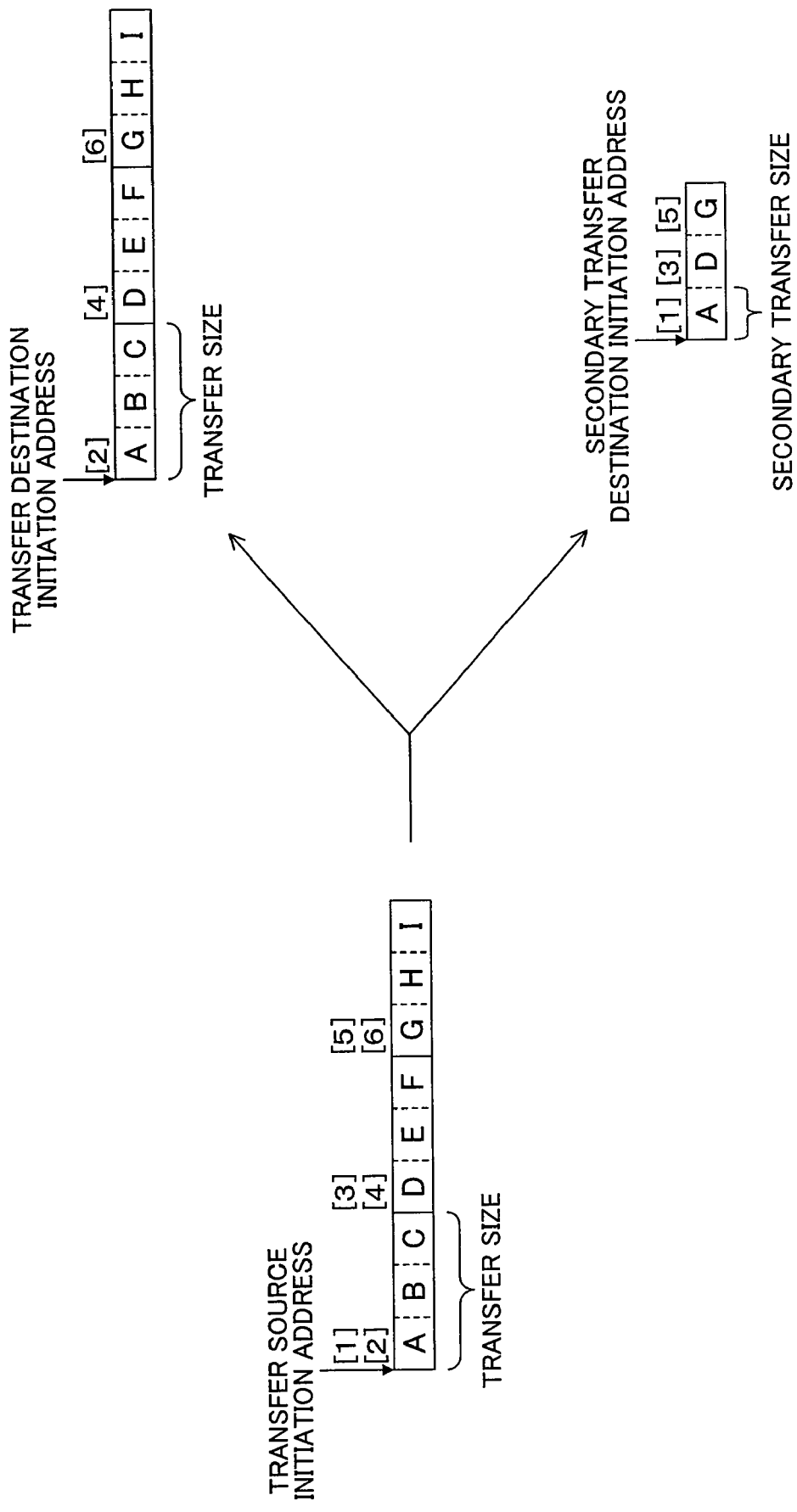
FIG. 9 is a view showing the relationship between a part of data which is copied and distributed and the setting register in a variation of the fifth embodiment.

In the transfer control unit 120, the DMA transfer is performed in accordance with the contents of the obtained transfer informations. When the DMA transfer is completed, the transfer control unit 120 notifies the setting register 110 of the completion of the DMA transfer, and subtracts one from the number of transfers 1. When necessary, the transfer control unit 120 updates the transfer source initiation address 3, the transfer destination initiation address 4, and the secondary transfer source initiation address 13. When a next DMA transfer request is received, it is determined again whether or not the number of transfers 1 is one, and the transfer size to be inputted to the transfer control unit 120 is determined. When the number of transfers 1 reaches zero, a complete interrupt is outputted to notify the CPU, and all the transfers are completed. The condition of the transfer is shown in FIG. 7. The transfer size 2 and the transfer source initiation address 3, or the secondary transfer size 12 and the secondary transfer source initiation addresses 13 are alternately and individually used in consecutive transfers, and a transfer is performed in the order of (1) to (8) in the drawing. Consequently, data items at the two transfer sources are merged and sent to the transfer destination.

The description given above is only exemplary, and not restrictive. For example, the complete interrupt is not necessarily in the form of an interrupt, and a different method may also be adopted in which, e.g., the registers in the DMA transfer control device are polled. A DMA transfer request may also be issued by a different control operation, or a control operation which does not require a DMA transfer request may also be performed.

With the structure described above, it is possible in the present embodiment to alternately send data items of different sizes from the two transfer sources to the transfer destination. Accordingly, when data items such as pixel information are intended to be merged, the data items can be merged by merely making settings for one DMA transfer, and data merging can be implemented by only increasing a small number of hardware items.

By providing a plurality of the specified ordinal-number-of-transfer registers 6 of FIG. 1, causing the determination circuit 8 to provide a plurality of the output results, and providing a plurality of the secondary transfer source initiation addresses 23, it is possible to select among three or more transfer source initiation addresses, and perform a complicated transfer in which data items are merged from three or more transfer sources, and sent to a transfer destination.

Further, by providing the secondary transfer destination initiation address instead of the secondary transfer source initiation address, it becomes possible to distribute data from one transfer source to data items at two or more transfer destinations. Since the transfer is performed in the order of (1) to (8) in the drawing, data from one transfer source is distributed and sent to two transfer destinations.

In the case where it is possible to provide the secondary transfer destination initiation address and the secondary transfer mode instead of the secondary transfer source initiation address, and switch the transfer mode between a mode in which the transfer source initiation address is updated and a mode in which the transfer source initiation address is not updated, it becomes possible to obtain a part of transfer source data twice, and send the obtained parts of the transfer source data to respective transfer destinations. Since the transfer is performed in the order of (1) to (8) in the drawing, the parts of the transfer source data are copied and transmitted to the two transfer destinations. When the transfer destination initiation addresses are set the same, it is possible to copy and transfer a part of data. It is obvious that the transfer mode is not limited to the switching mentioned above.

Embodiment 6

Figure 10:
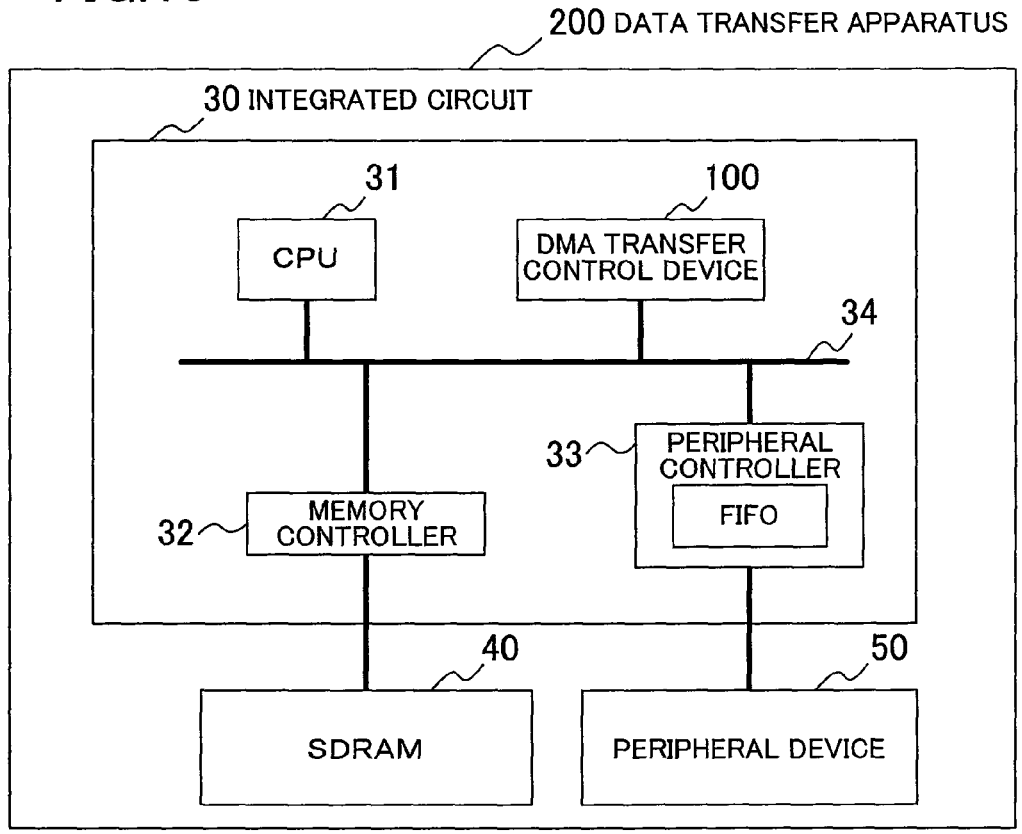
FIG. 10 is a block diagram showing a schematic structure of a data transfer apparatus according to a sixth embodiment of the present invention.
Figure 11:
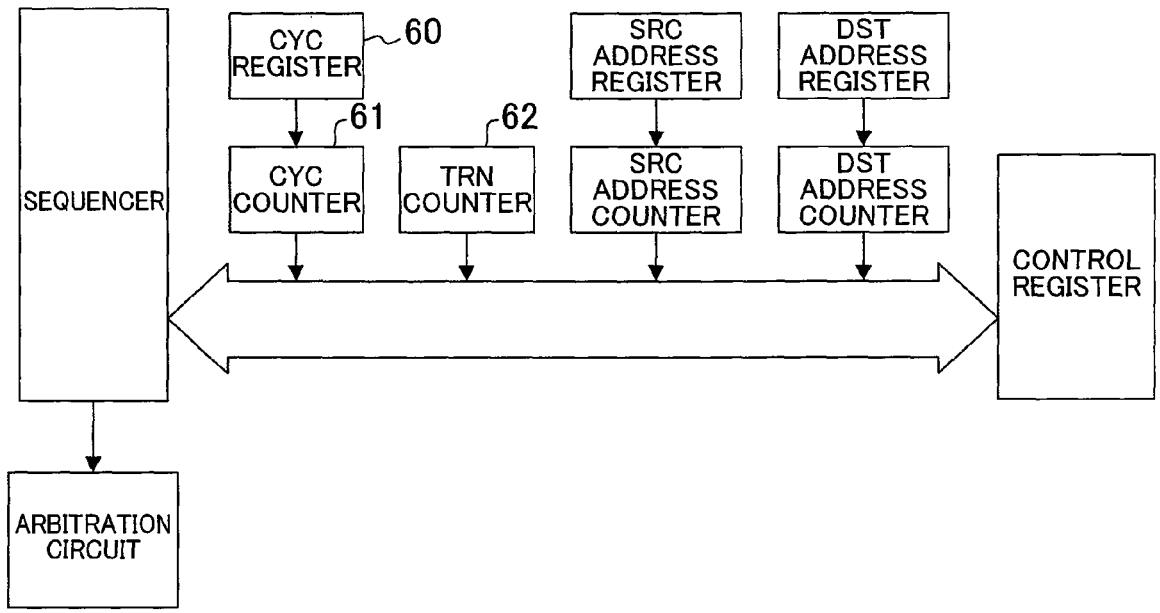
FIG. 11 is a block diagram showing a schematic structure of a conventional DMA transfer control device.

FIG. 10 is a block diagram showing a schematic structure of a DMA transfer apparatus 200 in the sixth embodiment of the present invention.

In FIG. 10, a data transfer apparatus 200 according to the present embodiment has an integrated circuit 30, a SDRAM 40, and a peripheral device 50. The integrated circuit 30 has a CPU 31, a DMA transfer control device 100, a memory controller 32, and a peripheral controller 33, which are interconnected by a bus 34. The memory controller 32 is connected to the SDRAM 40. The peripheral controller 33 is connected to the peripheral device 50. The DMA transfer control device 100 is that described in any of the first to fifth embodiments described above.

In the data transfer apparatus 200 according to the present embodiment, when data is extracted from the peripheral device 50 to the SDRAM 40 using the DMA transfer control device 100, the transfer size set in the DMA transfer control device 100 is determined depending on the capacity of a data FIFO buffer in the peripheral controller 33, and the speed of a data transfer from the peripheral device 50 into the FIFO buffer. When the total number of data items to be extracted is not an integral multiple of the determined transfer size mentioned above, a faction occurs with respect to the transfer size. At this time, the faction mentioned above is set to the secondary transfer size by the method described above in the fourth embodiment, and the secondary transfer size is used in the final transfer. The method allows the extraction of the total amount of data to be transferred by making settings for one DMA. By newly making settings for the DMA transfer midway during the extraction, a risk factor of belated data extraction is eliminated.

When data is transferred from the SDRAM 40 to the peripheral device 50 also, the transfer size set in the DMA transfer control device 100 is determined depending on the capacity of the data FIFO buffer in the peripheral controller 33, and the speed of a data transfer from the SDRAM 40 into the FIFO buffer.

When the total number of data items intended to be transferred is not an integral multiple of the determined transfer size mentioned above, a faction occurs with respect to the transfer size. At this time, the faction mentioned above is set to the secondary transfer size by the method described in above in the fourth embodiment, and the secondary transfer size is used in the final transfer. The method allows the transfer of the total mount of data to be transferred by making settings for one DMA transfer. By newly making settings for the DMA transfer midway during the transfer, a risk factor of a belated data transfer to the peripheral device 50 is eliminated.

Thus, the present invention is effective when the setting of the transfer size is determined by a factor outside of the DMA transfer control device, such as a peripheral device. It is obvious that the application of the present invention is not limited to an external memory device or a peripheral device. The present invention is also effective when an internal functional block in the integrated circuit 30 or the like is accessed.

The present invention can naturally be implemented by a method which combines the plurality of structures described above in the embodiments. The methods and the structures used in the embodiments of the present invention described above are only exemplary, and the present invention is not limited thereto.

What is claimed is:

1. A DMA transfer control device comprising:
    a setting register group configured to set transfer information;
    a number-of-transfers register to which the number of transfers to be performed is set, and which updates a value thereof every time a DMA transfer is completed; a transfer control unit;
    a secondary setting register group configured to set other transfer information different from the transfer information; and
    a specified ordinal-number-of-transfer register, wherein every time a DMA transfer is initiated, either a value of the setting register group or a value of the secondary setting register group is selected for each of the transfer information in accordance with a result of an arithmetic operation between a value of the number-of-transfers register and a value of the specified ordinal-number-of-transfer register, and inputted to the transfer control unit,
    a plurality of values of the secondary setting register group] are input to the transfer control unit before the number-of-transfers register is updated N times, where the N is the number of transfers to be performed, and
    after the plurality of values of the secondary setting register group are input to the transfer control unit, a value of the setting register group is input to the transfer control unit before the number-of-transfer register is updated N times.

2. The DMA transfer control device of claim 1, wherein the specified ordinal-number-of-transfer register and the secondary setting register group include a plurality of the specified ordinal-number-of-transfer registers and a plurality of the secondary setting register groups, respectively, and
    the value of the setting register group and the value of any of the plurality of specified ordinal-number-of-transfer register groups are selected for each of the transfer information.

3. The DMA transfer control device of claim 1, wherein any or all of a transfer size, a transfer source initiation address, a transfer destination initiation address, and a transfer mode are stored in the setting register group.

4. The DMA transfer control device of claim 1, wherein a match/mismatch between the value of the number-of-transfers register and the value of the specified ordinal-number-of-transfer register is determined by the arithmetic operation.

5. The DMA transfer control device of claim 1, wherein any of bits in the number-of-transfers register and the value of the specified ordinal-number-of-transfer register are used for the arithmetic operation.

6. The DMA transfer control device of claim 1, further comprising: an arithmetic operation register for determining a content of the arithmetic operation.

7. The DMA transfer control device of claim 1, wherein
    the setting register group, the number-of-transfers register, and the specified ordinal- number-of-transfer register are provided for each of a plurality of channels, and
    the setting register group to be used, the number-of-transfers register to be used, and the specified ordinal-number-of-transfer registers to be used are changed from one channel to another.

8. The DMA transfer control device of claim 7, wherein it is controlled for each of the channels whether the arithmetic operation is to be performed or the value of the setting register group corresponding to the channel is to be used.

9. A data transfer apparatus comprising: the DMA transfer control device of claim 1; and
    a peripheral device as a transfer source or a transfer destination of the DMA transfer control device.

10. The DMA transfer control device of claim 1, wherein a value of the specified ordinal-number-of-transfer register is not zero.

11. The DMA transfer control device of claim 1, wherein a value of the setting register group is input to the transfer control unit before the plurality of values of the secondary setting register group are input to the transfer control unit.

* * * * *